(12) United States Patent
Schievelbusch et al.

(10) Patent No.: US 8,814,082 B2
(45) Date of Patent: Aug. 26, 2014

(54) AIRCRAFT HIGH LIFT SYSTEM AND METHOD FOR DETERMINING AN OPERATING CONDITION OF AN AIRCRAFT HIGH LIFT SYSTEM

(75) Inventors: Bernd Schievelbusch, Lindenberg (DE); Bernhard Hauber, Weiler (DE)

(73) Assignee: Liebherr-Aerospace Lindenberg GmbH, Lindenberg/Allgaeu (DE)

( * ) Notice: Subject to any disclaimer, the term of this patent is extended or adjusted under 35 U.S.C. 154(b) by 1141 days.

(21) Appl. No.: 12/778,743

(22) Filed: May 12, 2010

(65) Prior Publication Data

US 2010/0288886 A1 Nov. 18, 2010

(30) Foreign Application Priority Data

May 12, 2009 (DE) .......................... 10 2009 020 840

(51) Int. Cl.
*B64C 13/16* (2006.01)
*B64D 45/00* (2006.01)

(52) U.S. Cl.
CPC ...... *B64D 45/0005* (2013.01); *B64D 2045/001* (2013.01)
USPC ........ 244/76 A; 244/99.2; 244/99.3; 244/213; 244/214; 244/215

(58) Field of Classification Search
USPC ...... 244/213, 214, 215, 194, 76 A, 99.2, 99.3
See application file for complete search history.

(56) References Cited

U.S. PATENT DOCUMENTS

| | | | | |
|---|---|---|---|---|
| 4,779,822 A | * | 10/1988 | Burandt et al. | 244/99.9 |
| 8,132,763 B2 | * | 3/2012 | Schievelbusch | 244/215 |
| 2004/0251382 A1 | * | 12/2004 | Schievelbusch | 244/75 R |
| 2006/0060719 A1 | | 3/2006 | Hauber et al. | |
| 2011/0255968 A1 | * | 10/2011 | Recksiek | 416/23 |

FOREIGN PATENT DOCUMENTS

| | | |
|---|---|---|
| DE | 10308301 | 7/2004 |
| EP | 0818387 | 1/1998 |
| GB | 1581197 | 12/1980 |

* cited by examiner

*Primary Examiner* — J. Woodrow Eldred
(74) *Attorney, Agent, or Firm* — Alleman Hall McCoy Russell & Tuttle LLP

(57) ABSTRACT

The present disclosure relates to an aircraft high lift system with at least one load station for actuating a flap of a wing, preferably a landing flap and/or a leading-edge flap, at least one transmission with transmission portions located between branch transmissions, wherein by means of the branch transmissions actuating energy can be branched off from the transmission to the load station, and to a method for determining an operating condition of an aircraft high lift system.

18 Claims, 3 Drawing Sheets

AIRCRAFT HIGH LIFT SYSTEM AND METHOD FOR DETERMINING AN OPERATING CONDITION OF AN AIRCRAFT HIGH LIFT SYSTEM

CROSS REFERENCE TO RELATED APPLICATION

This application claims priority to German Patent Application No. 10 2009 020 840.2, filed May 12, 2009, which is hereby incorporated by reference in its entirety for all purposes.

TECHNICAL FIELD

The present disclosure relates to an aircraft high lift system with at least one load station for actuating a flap of a wing, preferably a landing flap and/or a leading-edge flap, and at least one transmission with transmission portions located between branch transmissions, wherein by means of the branch transmissions actuating energy can be branched off from the transmission to the load station, and to a method for determining an operating condition of an aircraft high lift system.

BACKGROUND AND SUMMARY

Aircraft high lift systems which actuate and move wing flaps such as landing flaps and leading-edge flaps of the aircraft can get into inadmissible operating conditions or error conditions. For safety reasons, it is necessary to immediately detect these inadmissible operating conditions and preferably communicate the same directly to the pilot.

Inadmissible operating conditions can result for example from
- an interruption of a load path of a drive station of a wing flap ("disconnect"),
- an interruption in the transmission of the aircraft high lift system,
- a jamming of elements of a load path of a drive station ("jam"),
- a jamming in the transmission and/or
- a skewing of a flap body ("skew").

To avoid for example inadmissible loads in the jamming case ("jam"), aircraft high lift systems known from the prior art, as schematically shown in FIG. 1, employ mechanical torque limiters 18.

From DE 103 08 301 B3, an aircraft high lift system with an overload protection is known, which includes a drive system and elements for transmitting the drive energy over the entire wing span to drive stations of individual segments of landing flap/leading-edge flap systems. The overload protection consists of force sensors such as strain gauges and/or load cells arranged at the outlet of the respective drive station or of the actuating gears for the landing flaps or leading-edge flaps. Jamming cases in the actuating gear and/or in the transmission are, however, not detectable with this system.

The US 2006/0060719 A1 relates to an aircraft high lift system with a drive unit, elements for transmitting the drive energy to drive stations of individual segments of landing flap/leading-edge flap systems and with an overload protection, wherein the overload protection includes at least one electrical overload sensor which is arranged in the drive train between the drive unit and an output station.

All known systems have in common that an interruption of the load path merely is detected indirectly via the response of a torque limiter or by means of the resulting obvious skewing of a flap. Depending on the design of the structural components and the drive and guiding elements, the error can also remain unnoticed up to the next maintenance interval.

Furthermore, in the known aircraft high lift systems with mechanical torque limiter a localization of the error location generally can only be effected by visual inspection of the mechanical indications on the load limiters.

It would be desirable, however, to provide for a direct localization of the error location.

Therefore, it is the object of the present disclosure to develop an aircraft high lift system as mentioned above in an advantageous way, in particular to the effect that the same is of simpler and lighter construction due to the omission of heavy and complex components and provides for a localization of the error location independent of where the error is located in the system, i.e. also provides for detecting errors in the actuating gear and/or in the transmission.

In accordance with the present disclosure, this object is solved by an aircraft high lift system with at least one load station for actuating a flap of a wing, for example a landing flap and/or a leading-edge flap, and at least one transmission with transmission portions, which are disposed between branch transmissions, wherein by means of the branch transmissions, actuating energy can be branched off from the transmission to the load station, wherein at least one detection sensor is provided, by which an operating condition of the transmission and/or the load station can directly and/or indirectly be determined, wherein the detection means on the output side of the branch transmission is arranged in the inlet of the load station and/or in a transmission portion. Accordingly, it is provided that an aircraft high lift system includes at least one load station for actuating a wing flap, for example a landing flap and/or a leading-edge flap, and at least one transmission with transmission portions located between branch transmissions, wherein by means of the branch transmissions actuating energy can be branched off from the transmission to the load station. At least one detection means is provided, by means of which the operating condition of the transmission and/or the load station can directly and/or indirectly be determined, wherein the detection means on the output side of the branch transmission is arranged in the inlet of the load station and/or in a transmission portion.

This provides the advantage that a simple construction of the aircraft high lift system becomes possible. At the same time, a localization of a possible error is facilitated, since by assigning the signal to the detection means, whose arrangement in turn is known, the error location within the system is easily communicated. Furthermore, it is particularly advantageous that the error and also the error location can directly be communicated to the pilot.

Furthermore, it can be provided that by means of the detection means the torque applied and/or the time course of the torque can be detected and/or that the detection means is a torque sensor. This provides the advantage that the easily evaluatable characteristic of the torque or torque profile can be utilized for determining the operating condition and correspondingly also for faulty operating conditions. In the aircraft high lift system, reference values and/or curves or patterns for example can be stored in suitable means, which can be matched with current values. By such indirect evaluation, detailed conclusions as to the operating condition can already be made possible with a small number of detection means. Moreover, by means of the reference values and/or curves or patterns a detailed statement as to the kind of error and the error location in one and/or both of the load stations of a flap can already be made possible with only one single detection means.

It is furthermore conceivable that no mechanical torque limiter is present, in particular that no mechanical torque limiter is present on the output side of a transfer gear in the transmission branching off actuating energy provided by a central drive unit and/or that no mechanical torque limiter is present in a load station. This provides the advantage that the aircraft high lift system can be constructed simpler and lighter in weight. Due to the omission of the highly complex and heavy components, the prime costs, but also the maintenance costs are decreased, since the maintenance requirements can be reduced in addition.

Moreover, it is conceivable that an evaluation unit is provided, which has a signal connection with the at least one detection means and by means of which the signals of the detection means can be evaluated, in order to determine an operating condition. Advantageously, reference values and/or curves or patterns with respect to correct operating conditions and faulty operating conditions are stored in the evaluation unit or can be retrieved by the evaluation unit. It is furthermore conceivable that the evaluation unit logs its determination results and stores the same in a memory. Furthermore, the evaluation unit can communicate the current operating conditions to the pilot and also possibly issue warnings in the case of faulty operating conditions via an output unit such as a monitor or a control instrument in the cockpit.

Furthermore, it can be provided that the evaluation unit is a central evaluation unit which has a signal connection with all detection means of the aircraft high lift system. Thus, the information from the detection means of the left and right wing advantageously can be evaluated together in the central evaluation unit.

It is furthermore possible that a load station includes a station actuator and a spindle with a spindle nut, wherein the station actuator transmits the actuating torque to the spindle and the spindle nut converts the rotatory movement into a translational movement for the flap, and that the detection means in the load station is arranged before the station actuator.

It can also be provided that the transmission portion is a transmission portion between the branch transmissions of two load stations associated to a flap.

It is furthermore conceivable that by means of the detection means arranged in this transmission portion the torque applied there and/or the time course of the torque can be determined.

It can advantageously be provided that by monitoring the ratio of the load components of the load stations faulty operating conditions can be determined by means of the evaluation unit and/or that by monitoring and comparing pairs of the actuating forces applied at the load stations of the left and right wing of the aircraft faulty operating conditions can be determined by means of the evaluation unit and/or that by including the current values for wing configuration, the aircraft weight, the airspeed and/or the temperature a desired value for the actuating force applied at the load stations can be determined by means of the evaluation unit, and that by matching the actual values determined with the calculated desired values faulty operating conditions can be determined by means of the evaluation unit.

In particular, it is advantageous when by direct and/or indirect comparison of the load components of two load stations

- a jamming case in one of the load stations of two load stations associated to a flap can be determined by means of a rising operating torque in the first load station associated to the flap with constant operating torque of the second load station associated to the flap and/or
- an interruption of a load path in a first load station associated to a flap can be determined by means of the presence of the entire load on the intact load path of the second load station associated to the flap and/or
- a skewing of the flap after an interruption or a jump in the time course of the applied torque in a load station associated to the flap can be determined and/or
- an interruption in the transmission portion between the flaps can be determined by means of a torque decrease at both load stations by using at least one signal from position measuring means for determining the flap position and/or
- an interruption of the transmission portion between the load stations of the outer flap can be determined by means of the reaction of the inner load station and/or
- an interruption of the transmission portion between the load stations of the inner flap can be determined by means of a change in the ratios of the load components of the load stations of the inner and outer flap by using the evaluation unit.

Furthermore, the present disclosure relates to a method for determining an operating condition of an aircraft high lift system with at least one load station for actuating a flap of a wing, preferably a landing flap and/or leading-edge flap, and at least one transmission for transmitting actuating energy to the load stations, wherein with reference to the torque applied at the transmission and/or in the load station and/or the time course of the torque the operating condition of the aircraft high lift system is determined directly and/or indirectly. Accordingly, it is provided that in a method for determining an operating condition of an aircraft high lift system with at least one load station for actuating a wing flap, preferably landing flap and/or leading-edge flap, and at least one transmission for transmitting actuating energy to the load stations by means of the torque applied at the transmission and/or in the load station and/or the time course of the torque the operating condition of the aircraft high lift system is directly and/or indirectly determined.

Furthermore, it is conceivable that by monitoring and comparing pairs of the actuating forces applied at the load stations of the left and right wing of the aircraft faulty operating conditions are determined and/or that by including the current values for wing configuration, the aircraft weight, the airspeed and/or the temperature a desired value for the actuating force applied at the load stations is determined, and that by matching the actual values determined with the calculated desired values faulty operating conditions are determined.

In addition, it can be provided that by monitoring the ratio of the load components of the load stations faulty operating conditions are determined.

Furthermore it is possible that by direct and/or indirect comparison of the load components of two load stations

- a jamming case in one of the load stations of two load stations associated to a flap is determined by means of a rising operating torque in the first load station associated to the flap with constant operating torque of the second load station associated to the flap and/or
- an interruption of a load path in a first load station associated to a flap is determined by means of the presence of the entire load on the intact load path of the second load station associated to the flap and/or
- a skewing of the flap after an interruption or a jump in the time course of the applied torque in a load station associated to the flap is determined and/or
- an interruption in the transmission portion between the flaps is determined by means of a torque decrease at both load stations by using at least one signal from position measuring means for determining the flap position and/or an interruption of the transmission portion between the load stations of the outer flap is determined by means of the reaction of the inner load station and/or an interruption of the transmission portion between the load stations of the inner flap is determined by means of a change in the ratios of the load components of the load stations of the inner and outer flap.

Advantageously, the method is performed with the aircraft high lift system described herein.

Further details and advantages of the present disclosure will now be explained in detail with reference to an embodiment illustrated in the drawing.

DETAILED DESCRIPTION

Figure 1:
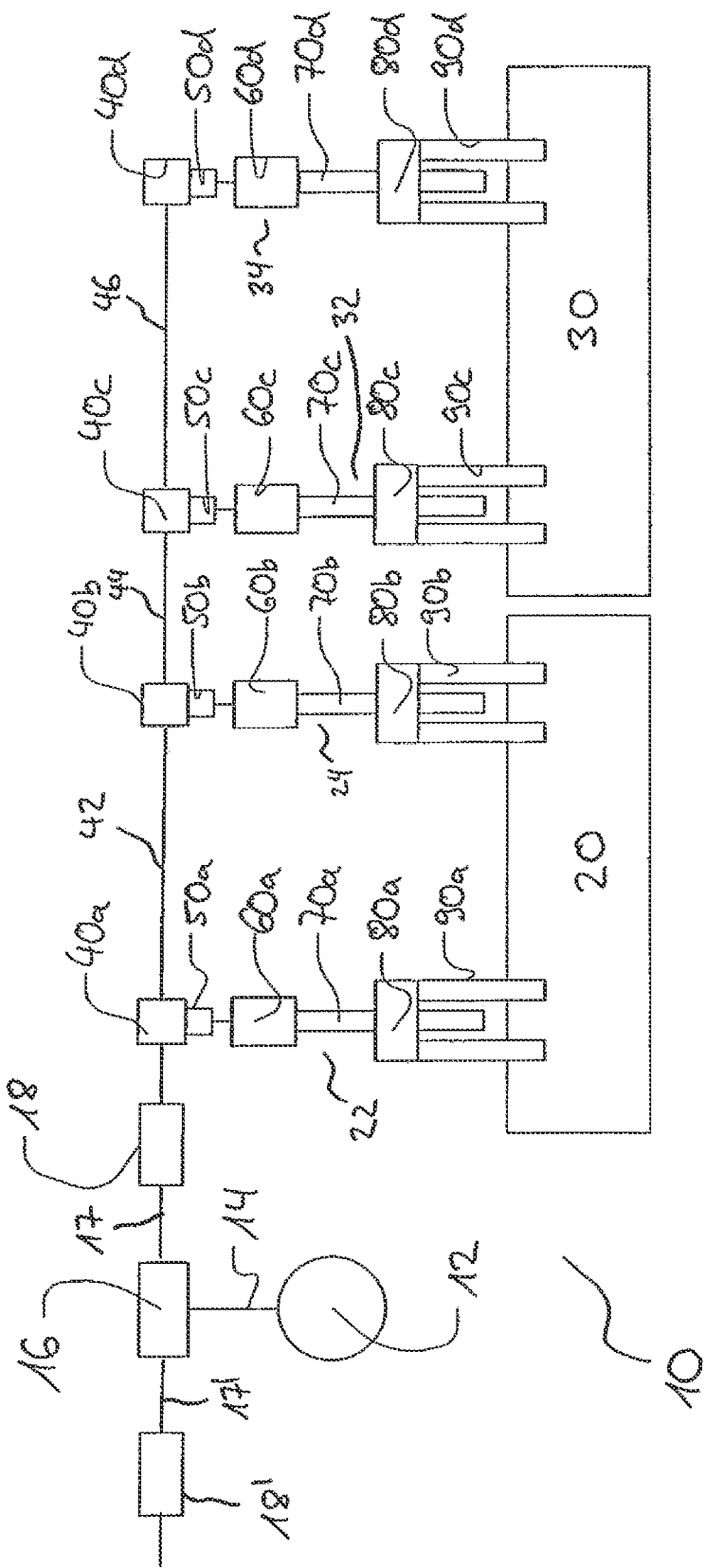
FIG. 1 shows a known aircraft high lift system in a schematic representation.

FIG. 1 shows a known aircraft high lift system 10 in a schematic representation. The aircraft high lift system 10 includes a central drive unit 12, by means of which electric or hydraulic energy of the aircraft supply is converted into mechanical actuating energy. By means of non-illustrated braking means, the aircraft high lift system can be maintained in position.

Via a central shaft 14, the central drive unit 12 transmits the actuating energy from the central drive unit 12 to a transfer gear 16, which distributes the actuating energy to the transmission 17 of the right wing and to the transmission 17' of the left wing. In the embodiment shown in FIG. 1, the construction of the aircraft high lift system substantially is only shown for the right wing.

On the output side of the transfer gear 16, a torque limiter 18, 18' is each provided, which on overload blocks the drive and dissipates the actuating torque into the non-illustrated supporting structure, in particular into the supporting structure of the transmission 17 in the fuselage and/or wing.

On the output side of the torque limiter 18, branch transmissions 40a, 40b, 40c, 40d are arranged in the transmission 17, which preferably are identical in construction. The branch transmissions 40a and 40b are associated to the right-hand inner landing flap 20 and the branch transmissions 40c and 40d are associated to the right-hand outer landing flap 30.

To each landing flap 20 and 30, two substantially preferably identically constructed load stations 22, 24, 32, 34 are associated. In detail, the load stations 22 and 24 are associated to the right-hand inner landing flap 20 and the load stations 32 and 34 are associated to the right-hand outer landing flap 30. The branch transmissions 40a, 40b, 40c, 40d each withdraw the required actuating energy for the load stations 22, 24, 32, 34 associated to the respective branch transmission 40a, 40b, 40c, 40d from the transmission 17.

Between the branch transmissions 40a and 40b a first transmission portion 42 is disposed, between the branch transmissions 40b and 40c a second transmission portion 44 is disposed, and between the branch transmissions 40c and 40d a third transmission portion 46 is disposed. The first and third transmission portions 42 and 46 are portions of the transmission 17, which are located between the branch transmissions 40a and 40b or 40c and 40d, respectively, which each are associated to a landing flap 20, 30.

The transmission portions 42, 44, 46 of the transmission 17 preferably, in particular for safety reasons, are configured and arranged uncoupled such that each load station 22, 24, 32, 34 can each be supplied with actuating energy independent of the condition of the remaining load stations.

After the branch transmission 40a, 40b, 40c, 40d a station torque limiter 50a, 50b, 50c, 50d is provided, which in a case of error limits the actuating torque transmitted and thus can prevent damages at the load station. On the output side of the station torque limiters 50a, 50b, 50c, 50d a station actuator 60a, 60b, 60c, 60d is provided, which converts the actuating torque and transmits the same to the spindle 70a, 70b, 70c, 70d.

The spindle 70a, 70b, 70c, 70d transmits the actuating energy to the spindle nut 80a, 80b, 80c, 80d, which in turn converts the rotatory movement transmitted to the same into a translational movement. Via the guide transmissions 90a, 90b, 90c, 90d, this translational movement or the actuating energy transmitted thereby is each forwarded to the flaps 20 and 30 and the kinematic course of the flap movement is determined.

Figure 2:
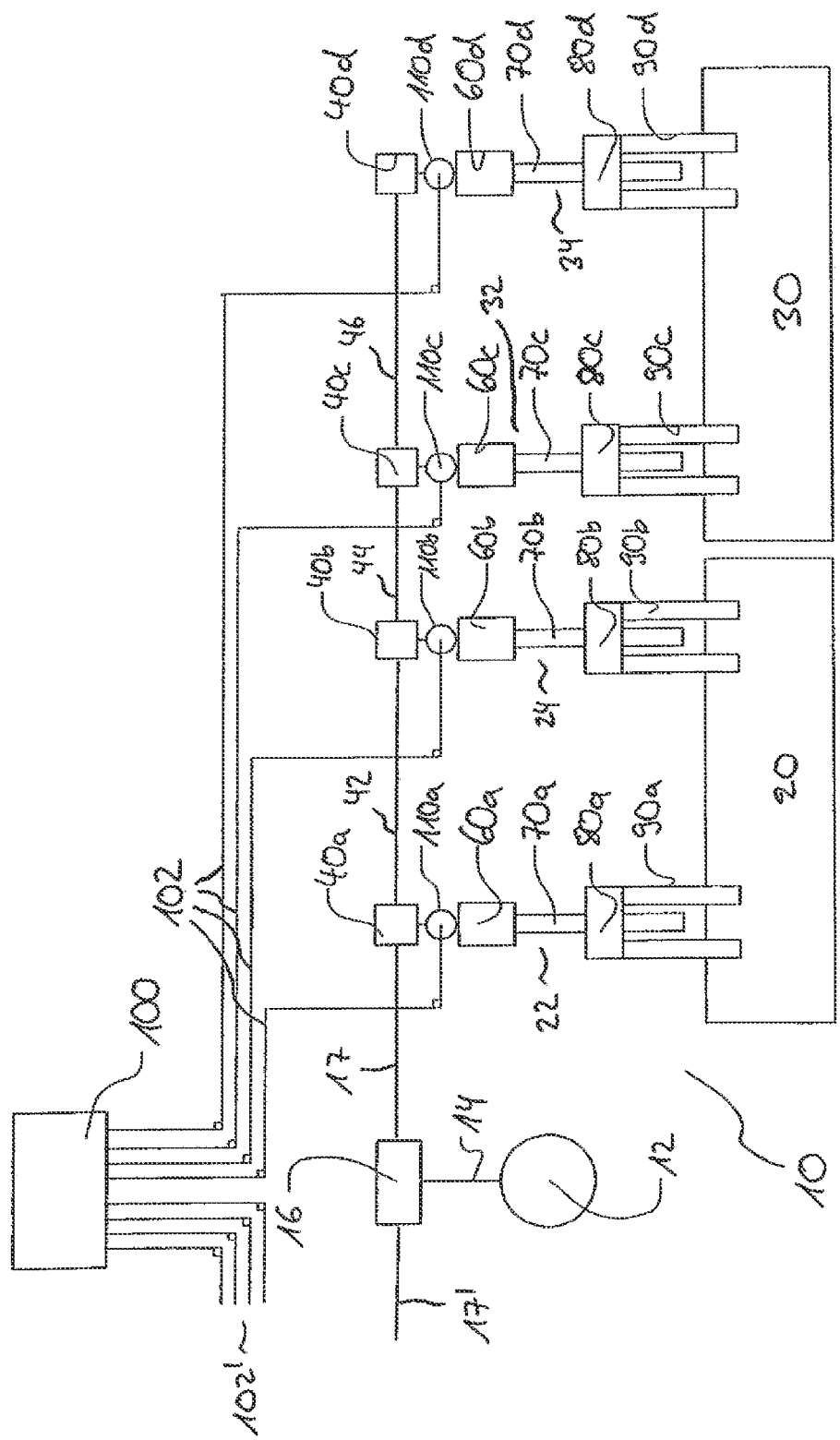
FIG. 2 shows an aircraft high lift system of the present disclosure in a schematic representation in a first embodiment.
Figure 3:
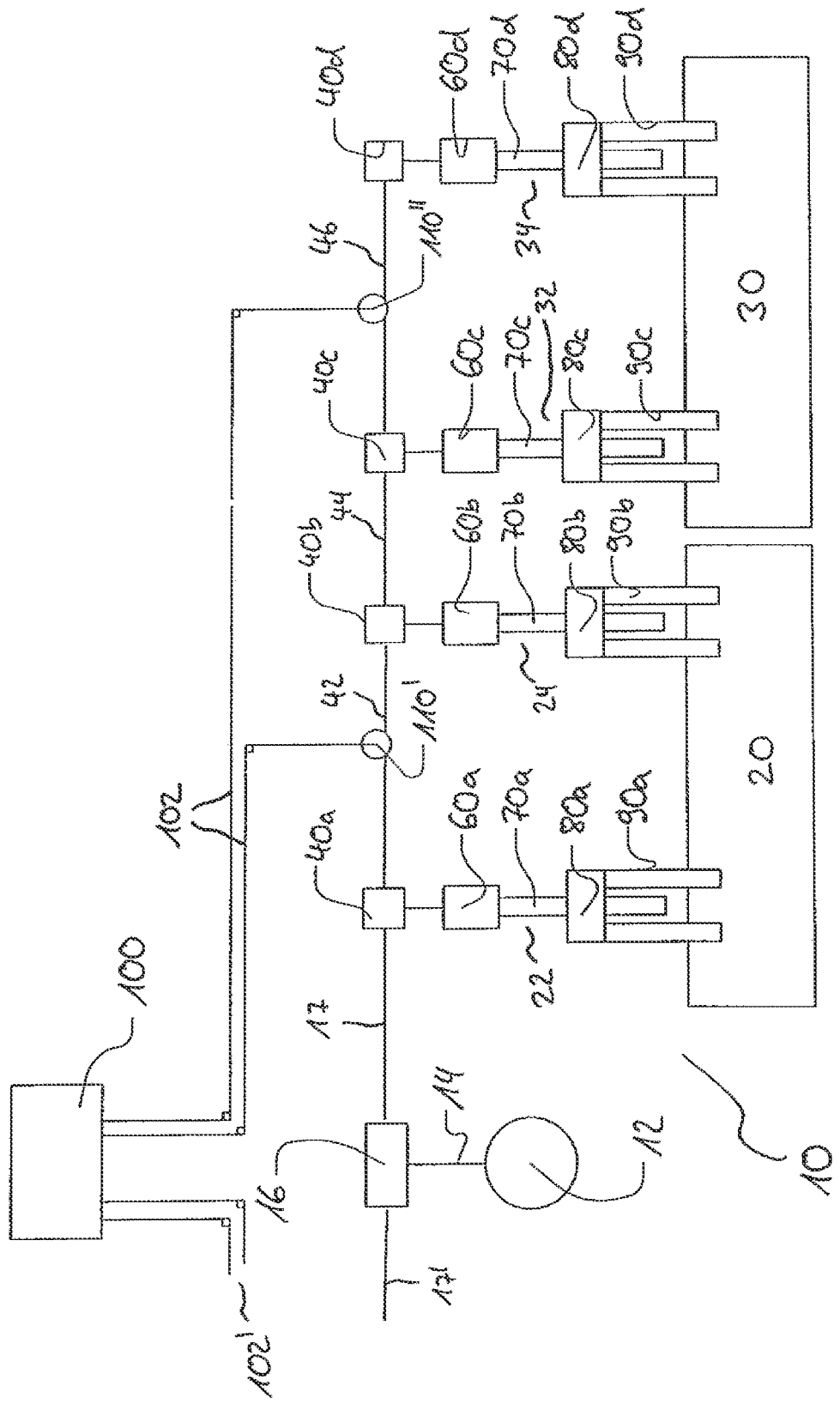
FIG. 3 shows an aircraft high lift system of the present disclosure in a schematic representation in a second embodiment.

In FIGS. 2 and 3, a first and a second embodiment for an aircraft high lift system in accordance with the present disclosure are shown. Comparable components are provided with the same reference numerals from FIG. 1.

In the embodiment of an aircraft high lift system 10 of the present disclosure as shown in FIG. 2 and in FIG. 3, the station torque limiters 50a, 50b, 50c, 50d and the system torque limiter 18 present in the aircraft high lift system 10 shown in FIG. 1 are missing.

In the embodiment of FIG. 2, detection means 110a, 110b, 110c, 110d configured as detection sensors, such as load sensors or torque sensors 110a, 110b, 110c, 110d each are arranged on the output side of the branch transmissions 40a, 40b, 40c, 40d and before the station actuators 60a, 60b, 60c, 60d or transmissions 60a, 60b, 60c, 60d on the input shaft of the respective load station 22, 24, 32, 34.

By means of the load sensors or torque sensors 110a, 110b, 110c, 110d the torque applied and hence also the actual torque profile can be detected. Corresponding signals are forwarded to the electronic evaluation unit 100 via the signal lines 102. Signal lines 102' lead to the non-illustrated left wing. Evaluation unit may include code and instructions on computer readable storage medium for carrying out the various method actions described herein.

In the embodiment shown in FIG. 3, load sensors 110' and 110" each are provided between individual load stations 22, 24 or 32, 34 of the flaps 20, 30, which have a signal connection with the evaluation unit 100 via signal lines 102.

The load sensor 110' associated to the right-hand inner flap 20 is arranged on the transmission shaft 42 or the transmission portion 42 between the load stations 22 and 24, whereas the load sensor 110" associated to the right-hand outer flap 30 is arranged on the transmission shaft 46 or the transmission portion 46 between the load stations 32 and 34.

Thus, advantageously, only one sensor 110' or 110" per flap 20, 30 is required, so that the number of required sensors 110', 110" for an aircraft high lift system 10 advantageously can be halved as compared to previously known systems. In principle, however, for example one or more additional sensors can be provided for reasons of redundancy.

All methods for error detection described with reference to FIG. 2 correspondingly can also be used with the aircraft high lift system shown in FIG. 3, in particular be performed by means of the evaluation unit 100, and in the two systems shown in FIGS. 2 and 3 rotary actuators can also be used instead of the spindles 70a, 70b, 70c, 70d.

In error-free operation, each load station 22, 24, 32, 34 transmits a certain amount of the wind load acting on the flap 20, 30. This load component is specified by the geometry of the flap 20, 30 and the aerodynamic load distribution and is only changed in a case of error. In consideration of these circumstances, a possibility for error detection is given by monitoring the ratio of the load components of the load stations 22, 24, 32, 34 or components thereof associated to a flap 20, 30. For monitoring the load components of the load stations 22, 24, 32, 34 or components thereof associated to a flap 20, 30, the procedure can be as follows:

Upon occurrence of a jamming case in a load station 22, 24, 32, 34, also referred to as "jam", the operating torque of the defective load station 22, 24, 32, 34 will rise comparatively strongly, whereas the load component of the intact load path does not change. Thus, the occurrence of a jamming case can be detected unambiguously by means of the evaluation unit 100.

In the case of an interruption of the load path within a first load station, also referred to as "disconnect", for example with the right-hand inner flap 20 the load station 22, no more load is transmitted along this path, whereas the intact load path, for example with the right-hand inner flap 20 the load station 24, must now bear the entire load. Thus, the occurrence of this error case can be detected unambiguously by means of the evaluation unit 100.

In the embodiment shown in FIG. 2, this is directly detectable by means of the signal of the load sensors 110a, 110b, 110c, 110d. In the embodiment shown in FIG. 3, this error case can be detected indirectly via the changed time course e.g. of the torque in particular within the transmission portions 42 and 46, which can be detected by the evaluation unit 100 for example by matching against reference curves.

The error case "skewing of a flap", also referred to as "skew", only occurs after an interruption of the load path and hence can also be detected by the evaluation unit 100. By means of the evaluation unit 100 and the load sensors 110a, 110b, 110c, 110d and 110', 110'', respectively, the time course of the torque in a load station 22, 24, 32, 34 can be monitored, so that an interruption of the load path is directly detected.

In the embodiment shown in FIG. 2, this is directly detectable by means of the signal of the load sensors 110a, 110b, 110c, 110d. In the embodiment shown in FIG. 3, this error case can be detected indirectly via the changed time course e.g. of the torque in particular within the transmission portions 42 and 46, which can be detected by the evaluation unit 100 for example by matching against reference curves.

In the case of an interruption of the transmission in the transmission portion 44 between the flaps 20 and 30, the flap 20 or 30 separated from the drive is set back by the wind load. Both torque sensors 110a and 110b or 110c and 110d according to the embodiment shown in FIG. 2 no longer measure any load. In the embodiment shown in FIG. 3, the load sensor 110' and/or 110'' associated to the flap 20 or 30 separated from the drive no longer measures any load.

This error case can e.g. be detected by non-illustrated position sensors, which preferably are connected with the evaluation unit 100.

Alternatively or in addition, the procedure can be as follows:

An interruption of the transmission 17 between the actuators of the outer flap, e.g. in the transmission portion 44 and/or 46, is detected like an interruption of the load path (see above), because the flap loads only are reacted to by the load stations 22, 24 of the inner flap 20.

An interruption of the transmission between the actuators of the inner flap 20 in the portion 42 likewise is unambiguously detected by the evaluation unit 100, because in this error case the load portion of the outer flap 30 is transmitted by the actuators of the inner flap 20 to the flap structure, which in this case serves as second load path. In this condition, the entire drive power of the half wing passes over the inner actuator 22 of the inner flap 20, whereas the outer actuator 24 of the inner flap 20 only supports the transmission of the outer flap 30. The ratio of the actuator loads hence clearly is changed and hence can unambiguously be associated to this error case.

In particular, it is advantageous that by means of the sensors 110a, 110b, 110c, 110d and 110', 110'', respectively, and by means of the signal transmitted by them the error location is also detected at the same time. An expensive search by the maintenance personnel hence can be omitted.

A jamming case in the transmission 17 can be detected for example by non-illustrated overload protection devices, in which e.g. sensors monitor the torque applied in the transmission.

For monitoring the loads of the load stations 22, 24, 32, 34 of the right and left wing, the procedure furthermore can be as follows:

With an undisturbed straight flight, the wind loads at the flaps 20, 30 of the right and left wing are the same. Since the drive systems of the flaps 20, 30 are axially symmetrical to the longitudinal axis of the aircraft, equal actuating forces are produced at the load stations to the left and right at equal positions, which are detected by the load sensors and are compared in pairs in an electronic evaluation unit. With reference to these criteria, it can additionally be detected by means of the evaluation unit 100 whether an interruption of the load path of a drive station or load station 22, 24, 32, 34, an interruption in the transmission 17, 17', a jamming of elements of the load path of a drive station, a jamming in the transmission 17, 17' and/or a skewing of a flap body 20, 30 has occurred.

It is provided to consider influences acting on the flaps 20, 30 of the right and left wing, which cause an unsymmetrical loading of the flaps 20, 30. These influences in particular include the unilateral use of a spoiler such as a roll spoiler, but also the influence of gusts, sideslip, turning flight, side wind or entry into turbulent wakes e.g. of an aircraft flying ahead. These influences generally are limited in time and can therefore be filtered out.

Furthermore, it is also possible to operate or support an error detection by means of a comparison of the desired and actual values of the loads:

For this purpose, a desired value for each load station 22, 24, 32, 34 is calculated by means of the evaluation unit 100 from the values for the configuration of the wing such as the flap angle, the aircraft weight, the airspeed, the temperature etc. and compared with the actual value measured. In the case of significant deviations, which are detectable e.g. by means of corresponding limit values, one of the error cases described above is detected. To each error case one or more limit values are associated, and when the same are exceeded or not reached, an error case will be detected unambiguously on the part of the evaluation unit.

The structure of the left part of the aircraft high lift system 10 of the present disclosure substantially is identical in construction, as shown in FIGS. 2 and 3. In principle, however, it is likewise conceivable to provide independent aircraft high lift systems 10 for the left and the right wing, as they are shown in FIG. 2 or 3.

Furthermore, it is conceivable in principle to configure an aircraft high lift system 10 such that it is a combination of the systems shown in FIGS. 2 and 3, i.e. includes both the torque sensors 110a, 110b, 110c, 110d and 110', 110'' with the arrangements shown in FIGS. 2 and 3.

The invention claimed is:

1. An aircraft high lift system comprising at least two load stations for actuating a flap of a wing, a central drive unit converting aircraft supply energy into mechanical actuating energy, the actuating energy transmitted from the central drive unit to a transfer gear, the transfer gear distributing the actuating energy to at least one transmission, each transmission comprising at least one transmission portion, each transmission portion arranged between respective branch transmissions of two load stations associated to the flap, wherein via each branch transmission, actuating energy is selectively transmitted from the transmission to the corresponding load station, the system further comprising a detection sensor arranged in each transmission portion by which an operating condition of the transmission or of one or more of the two load stations is determined.

2. The aircraft high lift system according to claim 1, wherein torque applied at the transmission or a time course of the torque is detected via the detection sensor, and wherein the flap is one of a landing flap and a leading-edge flap.

3. The aircraft high lift system according to claim 1, wherein the detection sensor is a torque sensor.

4. The aircraft high lift system according to claim 2, wherein the system does not include a mechanical torque limiter in the transmission on an output side of the transfer gear.

5. The aircraft high lift system according to claim 2, wherein the system does not include a mechanical torque limiter in any of the load stations.

6. The aircraft high lift system according to claim 1, further comprising an evaluation unit which has a signal connection with each detection sensor and by which signals of each detection sensor are evaluated in order to determine the said operating condition.

7. The aircraft high lift system according to claim 6, wherein the evaluation unit is a central evaluation unit which has a signal connection with each of a plurality of detection sensors of the aircraft high lift system.

8. The aircraft high lift system according to claim 7, wherein the load station includes a station actuator and a spindle with a spindle nut, wherein the station actuator transmits actuating torque to the spindle and the spindle nut converts a rotatory movement into a translational movement for the flap.

9. The aircraft high lift system according to claim 1, wherein there is only one torque sensor per flap.

10. The aircraft high lift system according to claim 8, wherein via the detection sensor arranged in each transmission portion, torque applied at the transmission or a time course of the torque is determined.

11. The aircraft high lift system according to claim 10, wherein by monitoring a ratio of load components of at least one load station, faulty operating conditions are determined via the evaluation unit.

12. The aircraft high lift system according to claim 10, wherein by monitoring and comparing pairs of actuating forces applied at load stations of a left and right wing of the aircraft, faulty operating conditions are determined via the evaluation unit.

13. The aircraft high lift system according to claim 12, wherein a desired value for the actuating force applied at at least one load station is calculated via the evaluation unit based on current values for wing configuration, aircraft weight, airspeed, or temperature, and wherein by matching actual values determined with the calculated desired values, faulty operating conditions are determined via the evaluation unit.

14. The aircraft high lift system according to claim 13, wherein by direct or indirect comparison of load components of two load stations, one or more of
  a jamming case in one of the two load stations associated with the flap is determined via a rising operating torque in a first load station associated with the flap with constant operating torque of a second load station associated with the flap;
  an interruption of a load path in the first load station associated with the flap is determined via a presence of an entire load on an intact load path of the second load station associated with the flap;
  a skewing of the flap after an interruption or a jump in the time course of the torque in a load station associated with the flap is determined;
  an interruption of a transmission portion between flaps is determined via a torque decrease at both of the two load stations by using at least one signal from a position measuring means for determining a flap position;
  an interruption of a transmission portion between load stations of an outer flap is determined via a reaction of an inner load station; or
  an interruption of a transmission portion between load stations of an inner flap is determined via a change in ratios of load components of the load stations of the inner and outer flaps by using the evaluation unit.

15. A method for an aircraft high lift system, comprising: determining an operating condition of the aircraft high lift system with at least two load stations for actuating a flap of a wing, and with at least one transmission for transmitting actuating energy to the at least two load stations, wherein the said operating condition of the aircraft high lift system is determined directly or indirectly based on signals from only one detection sensor per flap, the detection sensor for each flap arranged in the transmission and detecting one or more of a torque applied at the transmission, a torque applied in one or more of the load stations, or a time course of the torque.

16. The method according to claim 15,
  wherein by monitoring and comparing pairs of actuating forces applied at load stations of a left and right wing of the aircraft, faulty operating conditions are determined, or
  wherein desired values for the actuating forces applied at the load stations are calculated based on current values for wing configuration, aircraft weight, airspeed or temperature and by matching actual values determined with the calculated desired values, faulty operating conditions are determined,
  wherein the flap is a landing flap or a leading-edge flap.

17. The method according to claim 16, wherein by monitoring a ratio of load components of the load stations, faulty operating conditions are determined.

18. The method according to claim 17, wherein by direct or indirect comparison of the load components of two load stations
- a jamming case in one of the two load stations associated with the flap is determined via a rising operating torque in a first load station associated with the flap with constant operating torque of a second load station associated with the flap or
- an interruption of a load path in the first load station associated with the flap is determined via a presence of an entire load on an intact load path of the second load station associated with the flap or
- a skewing of the flap after an interruption or a jump in the time course of the torque in a load station associated with the flap is determined or
- an interruption in a transmission portion between flaps is determined via a torque decrease at both load stations by using at least one signal from a position measuring means for determining a flap position or
- an interruption of a transmission portion between load stations of an outer flap is determined via a reaction of an inner load station or
- an interruption of a transmission portion between load stations of an inner flap is determined via a change in ratios of load components of the load stations of the inner and outer flaps.

\* \* \* \* \*